Aug. 4, 1931.     B. M. NEWTON     1,816,865
MUSIC INSTRUCTION BOARD
Filed April 2, 1930     3 Sheets-Sheet 1
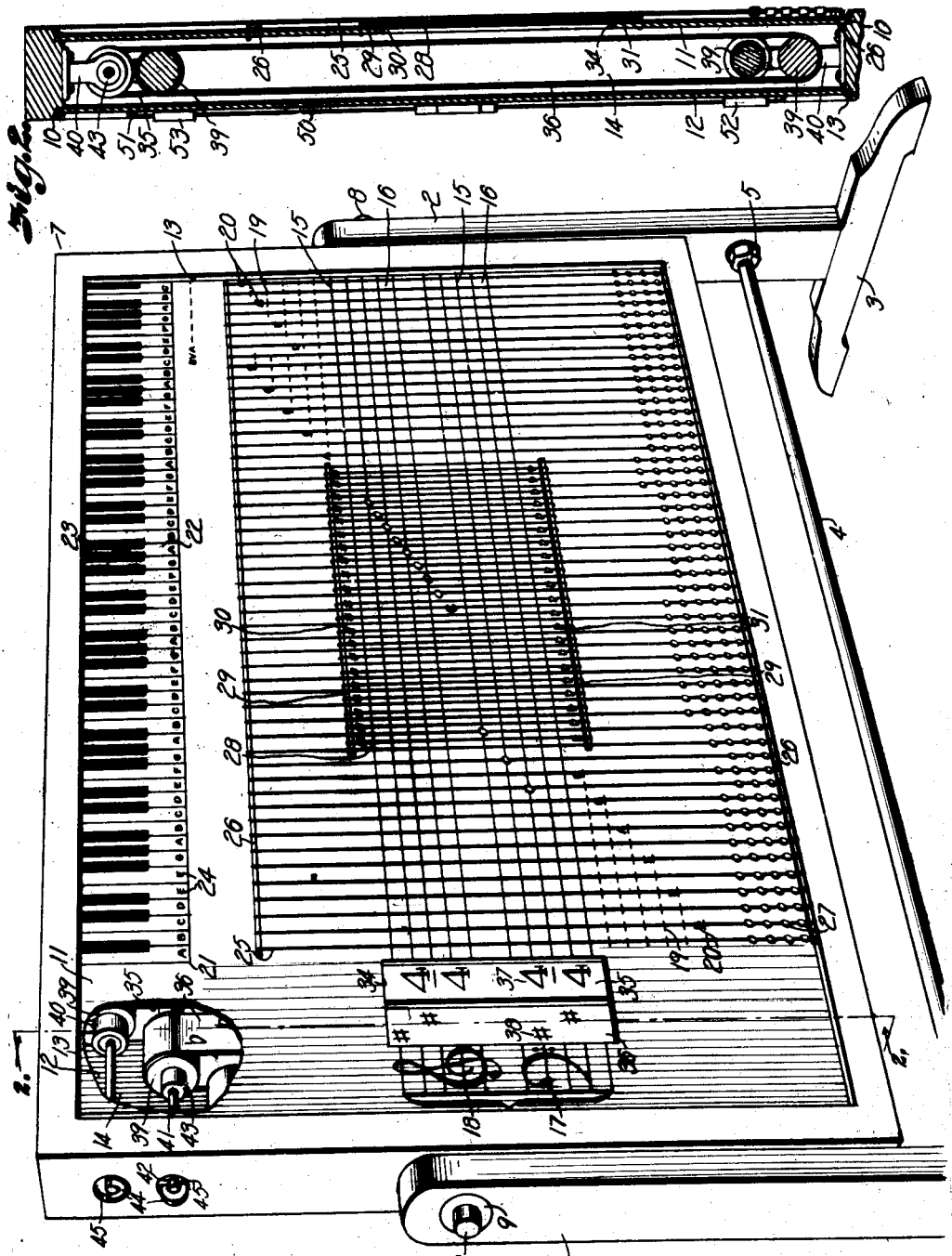
INVENTOR
Bertha M. Newton
BY Arthur C. Brown
ATTORNEY

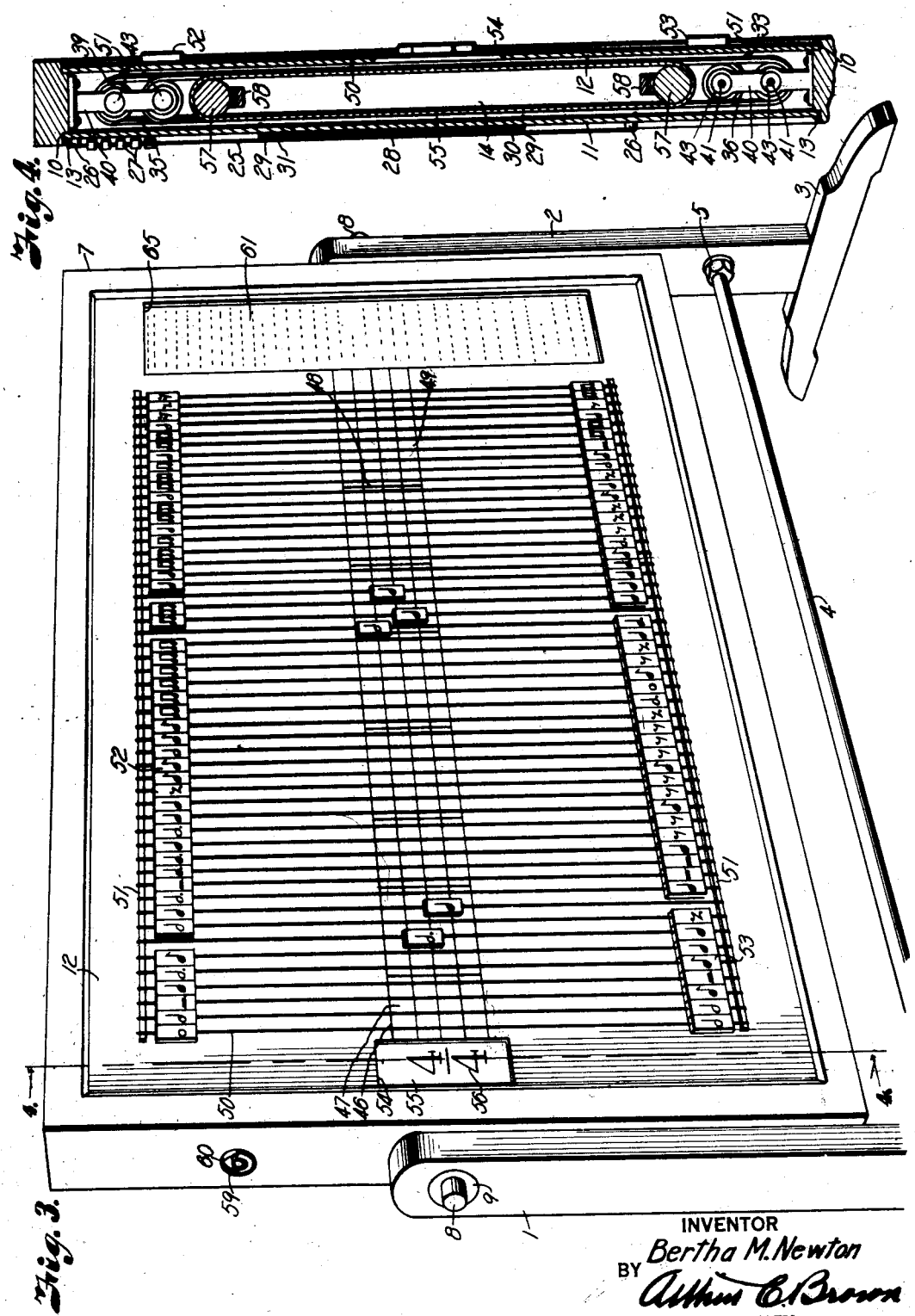

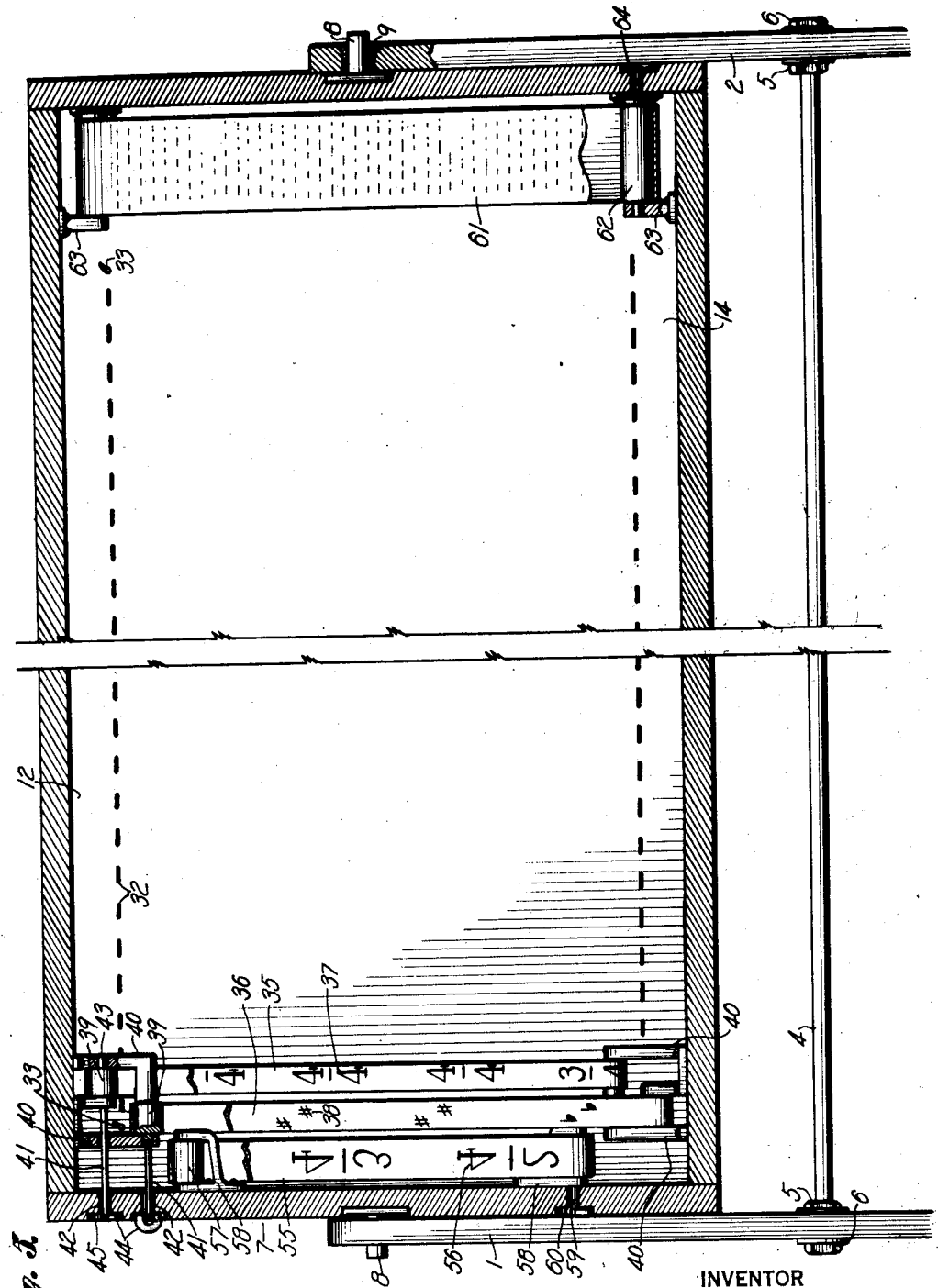

Patented Aug. 4, 1931

1,816,865

UNITED STATES PATENT OFFICE

BERTHA M. NEWTON, OF SAPULPA, OKLAHOMA

MUSIC INSTRUCTION BOARD

Application filed April 2, 1930. Serial No. 441,045.

My invention relates to educational appliances and more particularly to a device for teaching music by scientific demonstration, the principal object of my invention being to provide an apparatus whereby a comprehensive knowledge of music may be imparted from its rudimentary form for beginners to its highest form for very advanced pupils.

It is a further object of my invention to provide a simple and compact device of this character including means for readily moving various indicia, to extend the utility of the apparatus.

In accomplishing these and other objects of my invention I have provided improved details of structure the preferred form of which is illustrated in the accompanying drawings, wherein:

Fig. 1 is a perspective view of my invention, illustrating that face of the apparatus carrying a representation of a keyboard, a portion being broken away to disclose ribbon-moving mechanism.

Fig. 2 is a cross-section on the line 2—2 Fig. 1.

Fig. 3 is a view similar to Fig. 1, but illustrating the opposite face of the apparatus, carrying an arrangement for the study of time values in music.

Fig. 4 is a cross-section on the line 4—4 Fig. 3.

Fig. 5 is a central longitudinal section of the device particularly illustrating indicia-bearing ribbons and means for moving the same.

Referring more in detail to the drawings:

1 and 2 designate parallel standards supported on foot members 3 and retained in adjustable spaced relation by a rod 4 extended through the supports and threaded on its ends to receive inner and outer nuts and washers 5 and 6 respectively.

Pivotally supported between the standards is a rectangular frame 7, provided on a longitudinal center line with journals 8, mounted in aligning bearings 9 of the standards. The inner periphery of each side of the frame is grooved as indicated at 10 for respectively receiving panels 11 and 12, retained in the frame by binding strips 13; a space 14 being thus provided between the panels for the purpose presently described.

Panel 11, first to be described in detail, bears an arrangement for the study of the grand staff and all leger lines of the entire piano keyboard including the study of octaves, triads, major and minor chords, tetrachords, modulations, arpeggios, transposition, cadence, all forms of major, relative minor and chromatic scales, etc.

Extending longitudinally across the panel 11 near its center are staff lines 15 and staff spaces 16, the lower and upper divisions being marked respectively by the regulation bass and treble clef signs 17 and 18; parallel dotted leger lines 19, marked by indicia 20, being extended below and above the staff lines to completely represent the limits of musical notation.

Provided on the panel adjacent its upper edge and in transverse relation to the staff lines is a simulation of a piano keyboard 21, having white keys 22 and black keys 23, alphabetical letters 24 on the white keys designating the corresponding notes of a piano keyboard. A removable keyboard chart such as used for other string instruments may be placed elsewhere on the board in parallel relation with the keyboard 21.

Aligning with each note and extending transversely across the staff lines is a wire guide 25 stretched over ribs 26 adjacent its ends to raise the guide slightly above the panel; a plurality of notes 27 being slidably mounted on each guide for movement into selected relation with lines or spaces on the staff.

A second set of guide wires 28 stretched over ribs 29, is mounted near the vertical center of the panel for carrying sharp and flat indicia 30 and 31 to be used with the notes 27 when denoting accidentals in musical composition. The latter guide wires are preferably shorter than the guides 25 and while illustrated as extending only throughout three octaves, they may obviously be extended throughout the entire length of the keyboard. Extra double sharp and double flat indicia may be added on the wires, although these would seldom be required.

As particularly illustrated in Fig. 5 the guides may comprise a continuous wire or cord threaded back and forth through openings 32 in the panel and knotted at its ends as indicated at 33, although other suitable means may be employed for securing the guides in their respective position.

In order to further adapt my invention for demonstrating and imparting musical knowledge, I have provided means for denoting time and key signatures, said means including a rectangular opening or window 34 intersecting the staff lines adjacent the bass and treble clef signs.

Cooperating with the window are individual ribbons 35 and 36, respectively bearing the various time and key signatures 37 and 38, the ribbons running over rollers 39 mounted in bearing brackets 40.

Operating shafts 41, extended through openings 42 in the frame and threaded into annular bearing bosses 43 of the rollers, are provided on their outer ends with hinged handle portions 44 for individually moving the ribbons across the window opening to align selected time or key signatures with the staff lines and spaces; sockets 45 in the frame receiving the handle portions when in inoperative position to permit freedom of rotation of the frame on its pivots.

Panel 12 carrying an arrangement for the study of time values is provided near its center with longitudinal staff lines 46 forming staff spaces 47, said lines being divided by cross lines 48 into measures 49. A series of wire guides 50 stretched in transverse relation with the staff lines on ribs 51 carry sets of upper and lower blocks 52 and 53 respectively marked with a variation of time values ranging from a whole to a 16th note, a similar variation of rest representations being also provided to permit an arrangement of various note and rest combinations for each measure.

In the panel 12 adjacent the left end of the staff lines is an opening or window 54, cooperating with a ribbon 55 bearing time signatures 56, and running over upper and lower rollers 57 mounted in bearing brackets 58. An operating shaft 59, similar to those described above, is extended through an opening 60 in the frame and threaded into the upper roller for moving the ribbon to align selected time signatures with the staff.

As a final step to make my apparatus as complete as possible to thoroughly acquaint the pupil with every angle of musical knowledge I provide a chart 61 of information in the form of a belt carried on rollers 62 mounted in bearing brackets 63, the chart being moved by an operating shaft 64, across an opening 65, in the panel 12 adjacent its end opposite the window 54.

Information as to musical terms, time valuations, grand opera compositions, with dates and names of composers, old music masters, their nationality, date of birth and death, oratorios, various instruments and their inventors, etc. may be printed on the chart so that it may be available to students for reference and study.

Assuming an apparatus to be constructed and assembled as described, either panel may be presented to the pupil or school by rotating the frame on its pivot.

With the panel carrying the representation of a keyboard turned to face the pupil, the teacher can give instructions by demonstration covering branches such as octaves, triads, intervals, major and minor chords, tetrachords, modulations, arpeggios, transposition cadence, etc. The pupil by moving the ribbons and sliding the notes on the guides can write melodies in any key with any time signature.

Through provision of the short set of guides carrying the sharp and flat indicia, together with the five notes provided on each corresponding long guide wire, full chords, the dominant 7th chords and the diminished and augmented chords in their positions and inversions may be arranged in their proper relation with the staff lines and spaces.

By rotating the frame to present the opposite panel, the pupil can move any time signature into its position in the window to align with the staff lines. Various combinations of notes and rests may be moved into either of the measures from the upper and lower rows of blocks, to constitute a combined time value corresponding to the time signature in the window.

From the foregoing it will be apparent that a thorough and comprehensive knowledge of music may be imparted and obtained with the use of my apparatus, and that it is adapted for either private or class work in studios or public schools.

What I claim and desire to secure by Letters Patent is:

1. In apparatus of the character described, a panel or the like bearing a representation of a keyboard and a musical staff, said lines of the staff being in transverse relation with the keys of the keyboard, guides crossing the staff lines and aligning with said keys, notes on the guides adapted to be moved into selective position with the staff lines, independent time and key signatures for the staff, and means for moving said signatures into alignment with the staff.

2. In apparatus of the character described, a panel or the like bearing a representation of a keyboard and a musical staff, notes in alignment with the keys of the board and adapted to be moved into alignment with the staff, independent time and key signatures for the staff, and means for moving said signatures into alignment with the staff.

3. In apparatus of the character described, a panel or the like bearing a representation of a keyboard and a musical staff, said panel having an opening intersecting the staff, notes adapted to be moved into alignment with the staff and keys of the board, key signatures for the staff, and means for moving said signatures across the opening into alignment with the staff.

4. In apparatus of the character described, a panel or the like bearing a representation of a keyboard and a musical staff, said panel having a sight opening intersecting the staff, notes in alignment with the keys of the board, and adapted to be moved into alignment with the staff, independent time and key signatures for the staff, and means for moving said signatures into alignment with the staff.

5. In apparatus of the character described, a panel or the like bearing a representation of a keyboard and a musical staff, said panel having a window in transverse relation with the staff, notes adapted to be moved into alignment with the staff and keys of the board, rollers mounted on the panel at opposite ends of the window, a ribbon on the rollers carrying key signatures, and means for moving the ribbon across the window to selectively align signatures with the staff.

6. In apparatus of the character described, a panel or the like bearing a representation of a keyboard and a musical staff, said panel having a window in transverse relation with the staff, notes adapted to be moved into alignment with the staff and keys of the board, rollers mounted on the panel at opposite ends of the window, independent ribbons on the rollers carrying respectively time and key signatures, and independent means for moving the ribbons across the window to selectively align signatures with the staff.

7. In apparatus of the character described, a panel or the like bearing a representation of a keyboard and a musical staff, said lines of the staff being in transverse relation with the keys of the board, said panel having a sight opening intersecting the staff, guides crossing the staff lines and aligning with said keys, notes on the guides adapted to be moved into relative position with the staff lines, ribbons cooperating with the opening and carrying respectively time and key signatures, and means for moving the ribbons across said opening to selectively align signatures with the staff.

8. In apparatus of the character described, a panel or the like bearing a representation of a keyboard and a musical staff, said lines of the staff being in transverse relation with the keys of the board, said panel having a sight opening intersecting the staff, guides crossing the staff lines and aligning with said keys, a plurality of notes on each guide adapted to be moved individually into selected position relative to the staff lines, ribbons cooperating with the opening and carrying respectively time key signatures, and means for moving the ribbons individually across said opening to selectively align signatures with the staff.

9. In apparatus of the character described, a panel or the like bearing a representation of a keyboard and a musical staff, said lines of the staff being in transverse relation with the keys of the board, guides crossing the staff lines and aligning with said keys, a plurality of notes on each guide adapted to be moved individually into selected position relative to the staff lines, a second set of short guides between said first named guides, and markers on the short guides adapted to be moved across the staff lines to cooperate with said notes.

10. In apparatus of the character described, a panel or the like bearing an arrangement for the study of time, including staff lines on the panel, guides on the panel and crossing the staff lines in transverse relation therewith, markers on the guides adapted to be moved into relation with the staff to denote different time values, said panel having a sight opening arranged transversely with the staff, a ribbon cooperating with the opening and carrying time signatures, and means for moving the ribbon across said opening to align desired signatures with the staff.

11. In apparatus of the character described, a panel or the like bearing an arrangement for the study of time, including staff lines on the panel, cross lines dividing the staff into measures, guides on the panel and crossing the staff lines in transverse relation therewith, markers on the guides adapted to be moved into relation with measures of the staff, said panel having a window arranged transversely with the staff, spools mounted on the panel at opposite ends of the window, a ribbon on the spool carrying a series of time signatures, and means for moving said ribbon across the window to selectively align signatures with the staff.

12. In apparatus of the character described, a panel or the like bearing an arrangement for the study of time, including staff lines on the panel, cross lines dividing the staff lines into measures, guides on the panel and crossing the staff lines in transverse relation therewith, markers of different time values on the guides adjacent their ends, a ribbon carrying a series of time signatures, and means for moving said ribbon in transverse relation with the staff to selectively align signatures with the staff.

13. In apparatus of the character described, a panel or the like bearing an arrangement for the study of time, said panel having a sight opening, an endless belt comprising an information chart adapted to be moved across said opening, staff lines on the panel, cross lines dividing the staff lines into measures, guides on the panel and crossing the staff lines in transverse relation therewith, markers of different time values on the guides adjacent their ends, a ribbon carrying a series of time signatures, and means for moving said ribbon in transverse relation with the staff to selectively align signatures with the staff.

14. In apparatus of the character described, a pair of spaced standards, a frame pivotally mounted between said standards, a panel in the frame bearing a representation of a keyboard and a musical staff, said panel having a sight opening, a second panel in the frame spaced from said first-named panel and bearing an arrangement for the study of time, said second panel having a sight opening, rollers mounted between the panels, ribbons on the rollers cooperating with said openings and carrying signatures, and means for moving said ribbons across the openings.

In testimony whereof I affix my signature.

BERTHA M. NEWTON.